(12) United States Patent
Ben-Rubi

(10) Patent No.: US 12,019,903 B2
(45) Date of Patent: Jun. 25, 2024

(54) DATA STORAGE DEVICE WITH FLOW TRACKING ABILITY

(71) Applicant: Western Digital Technologies, Inc., San Jose, CA (US)

(72) Inventor: Refael Ben-Rubi, Rosh Haayin (IL)

(73) Assignee: Western Digital Technologies, Inc., San Jose, CA (US)

(*) Notice: Subject to any disclaimer, the term of this patent is extended or adjusted under 35 U.S.C. 154(b) by 86 days.

(21) Appl. No.: 17/959,497

(22) Filed: Oct. 4, 2022

(65) Prior Publication Data

US 2024/0111447 A1 Apr. 4, 2024

(51) Int. Cl.
  *G06F 11/07* (2006.01)
  *G06F 3/06* (2006.01)

(52) U.S. Cl.
  CPC .......... *G06F 3/0653* (2013.01); *G06F 3/0619* (2013.01); *G06F 3/0673* (2013.01); *G06F 11/073* (2013.01); *G06F 11/079* (2013.01)

(58) Field of Classification Search
  CPC .... G06F 11/073; G06F 11/079; G06F 3/0653; G06F 3/0673; G06F 3/0619
  See application file for complete search history.

(56) References Cited

U.S. PATENT DOCUMENTS

| | | | |
|---|---|---|---|
| 8,561,025 B1 | 10/2013 | Bisht et al. | |
| 10,180,799 B2 | 1/2019 | Mola | |
| 10,733,077 B2 | 8/2020 | Menon et al. | |
| 11,294,743 B2 | 4/2022 | Konan et al. | |
| 11,656,791 B2 * | 5/2023 | Chiu | G06F 3/0679 711/154 |
| 2023/0017942 A1 * | 1/2023 | Hieb | G06F 3/0673 |

FOREIGN PATENT DOCUMENTS

CN 114327300 A 4/2022

* cited by examiner

*Primary Examiner* — Nadeem Iqbal
(74) *Attorney, Agent, or Firm* — PATTERSON + SHERIDAN, LLP

(57) ABSTRACT

The present disclosure generally relates to improved event filtering, debugging, and flow communication through a flow identifier. Rather than sending messages or events with no identity or with local identity (that is identity that has meaning only to a few modules, and not to all the modules), this disclosure suggests adding a flow identifier to each message or event. The flow identifier is at least two bits added to each message to be later identified when needed. A first message is sent to a HW or FW module. At either the HW or FW module an event will be generated. When the event is generated the flow identifier will be added to the event. The HW or FW module will then send the generated events along with the flow identifier to the TBRAM. Once received, the TBRAM will send the events along with the flow identifier to a PC.

19 Claims, 5 Drawing Sheets

DATA STORAGE DEVICE WITH FLOW TRACKING ABILITY

BACKGROUND OF THE DISCLOSURE

Field of the Disclosure

Embodiments of the present disclosure generally relate to improved flow communication through a flow identifier.

Description of the Related Art

The error log is a small database that describes an error that just occurred in a system. Error logs are used for debugging in the developmental stages and in return merchandise authorization (RMA) stages. Error logs are also used for integration of new platforms and new memory devices. Furthermore, error logs are used when devices fail within the customer premise. Usually the error log is 4K of data that composed of data that is taken from the flash translation layer (FTL), the data path CPU, the front end, and the infrastructures modul. All of the data from the moduls combined together to generate a database. The error database is generally 4 k in size.

There is another term that is called event log. There is a system of event trace (SET) module as well. When referring to SET's a certain write register of 32 bits represents the data that a system of a certain hardware (HW) or firmware (FW) module wants to throw out. The 32 bits to be thrown out may be increased. There are many software modules and HW modules that can generate the event in the system to throw out data. For example, every CPU, the log structured file system (LFS), the PS, the main CPU, the power control unit (PCU) which is the CPU that handles power can all generate events. All the HW modules can generate events such as the flash in module (FIM), low density priority check (LPDC), the automatic buffer management (ABM). There are two destinations for the event logs inside the 4K. About 3K of space is dedicated to the error log, while the other 1K is dedicated to the destination of event logs. In previous implementation. A system with 800 events (each one 4 bytes size so the total is 3200 bytes) were sent to the error log, and the other 800 bytes (more or less 10 bytes) was more data like global variables. The 3200 bytes from the events and the 800 bytes from the global variables filled the 4 k of one entry in the error log. The second destination for events is the serial interface.

Flow is a chain of modules that communicate with one another to serve as one access originated from the host device. Today there are several modules that work in parallel in the flow. These modules all have events that are logged. The events are logged in the two destinations, but are difficult to identify when all the events from each module overlap. There are so many events that pass through the flow that there is no efficient system to filter necessary events. When specific event details are needed, the system has to read the entire event log. The large amount of events passed through the flow causes increased event loss. Since the capacity for the serial channel can only handle so many events that leave the serial channel port, some events may be lost.

Therefore, there is a need in the art for improved flow communication.

SUMMARY OF THE DISCLOSURE

The present disclosure generally relates to improved event filtering, debugging, and flow communication through a flow identifier. Rather than sending messages or events with no identity or with local identity (that is identity that has meaning only to a few modules, and not to all the modules), this disclosure suggests adding a flow identifier to each message or event. The flow identifier is at least two bits added to each message to be later identified when needed. A first message is sent to a HW or FW module. At either the HW or FW module an event will be generated. When the event is generated the flow identifier will be added to the event. The HW or FW module will then send the generated events along with the flow identifier to the TBRAM. Once received, the TBRAM will send the events along with the flow identifier to a PC.

In one embodiment, a data storage device comprises: a memory device; and a controller coupled to the memory device, wherein the controller includes one or more HW and/or FW modules communicatively couple together, wherein the controller is configured to: receive a first message at a first module; add a flow-identifier to the first message at the first module; process the first message at the first module to create a second message; and send the second message together with the flow-identifier to a third module.

In another embodiment, a data storage device comprises: memory means; and a controller coupled to the memory means, wherein the controller is configured to: attach a first flow identifier to a first message sent between a first module and a second module within the controller; send a second message between the second module and a third module; and attach the first flow identifier to the second message.

In another embodiment, a data storage device comprises: memory means; and a controller coupled to the memory means, wherein the controller is configured to: attach a first flow identifier to a first message sent between a first module and a second module within the controller; send a second message between the second module and a third module; and attach the first flow identifier to the second message.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to improved event filtering, debugging, and flow communication through a flow identifier. Rather than sending messages or events with no identity or with local identity (that is identity that has meaning only to a few modules, and not to all the modules), this disclosure suggests adding a flow identifier to each message or event. The flow identifier is at least two bits added to each message to be later identified when needed. A first message is sent to a HW or FW module. At either the HW or FW module an event will be generated. When the event is generated the flow identifier will be added to the event. The HW or FW module will then send the generated events along with the flow identifier to the TBRAM. Once received, the TBRAM will send the events along with the flow identifier to a PC.

Figure 1:
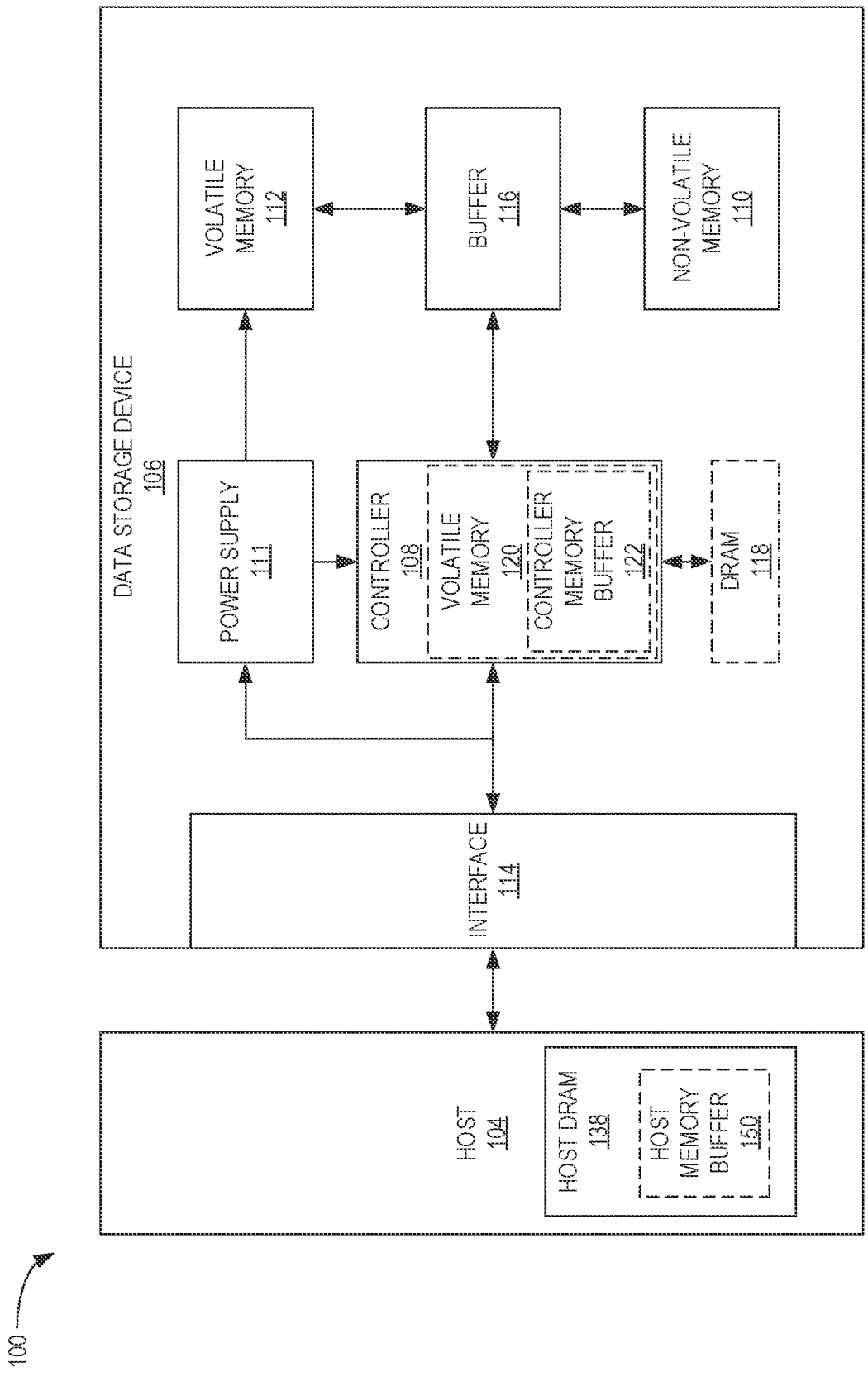
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Flow is the chain of modules that communicate with each other to serve one access originated from a host device or one access originated internally. As will be discussed in detail below, a flow identifier will be added to every message in the system and will be sent along all of the flow. For a host message, the flow identifier will be set to the first message and in that flow that arrives from a host device. For internal messages, the flow identifier will be set to the first message that was originated by an internal module. When sending messages, the new field of flow identifier will be in the interface protocol between one FW or HW module and another FW or HW module. As an example, the flow identifier will be in the interface protocol between the main processor and a PS processor; between a PS processor to a low level flash sequencer (LLFS) processor; between a LLFS processor and a low density parity check (LDPC) HW in the descriptor; between a LLFS processor and a FIM HW in the descriptor; between a LLFS processor and a HIM HW in the descriptor; between task (or thread) inside the main processor to another task inside the main processor; or between an XOR module when the XOR module performs reads from flash to the PS, just to name a few.

When one module activates another module, the one module will copy the flow identifier from an incoming message to the outgoing message for HW modules and for FW modules. The flow identifier will be the basis for filtering by applications. The filtering will be of data that belongs to a specific flow out of many (e.g., 64) flows. With the flow identifier, the engineer does not need to analyze all of the logged data. Rather, the engineer can only look at the specific channel that contains the interesting flow identifier. After such filtering, the engineer will see events one after another as the events happen.

Figure 2:
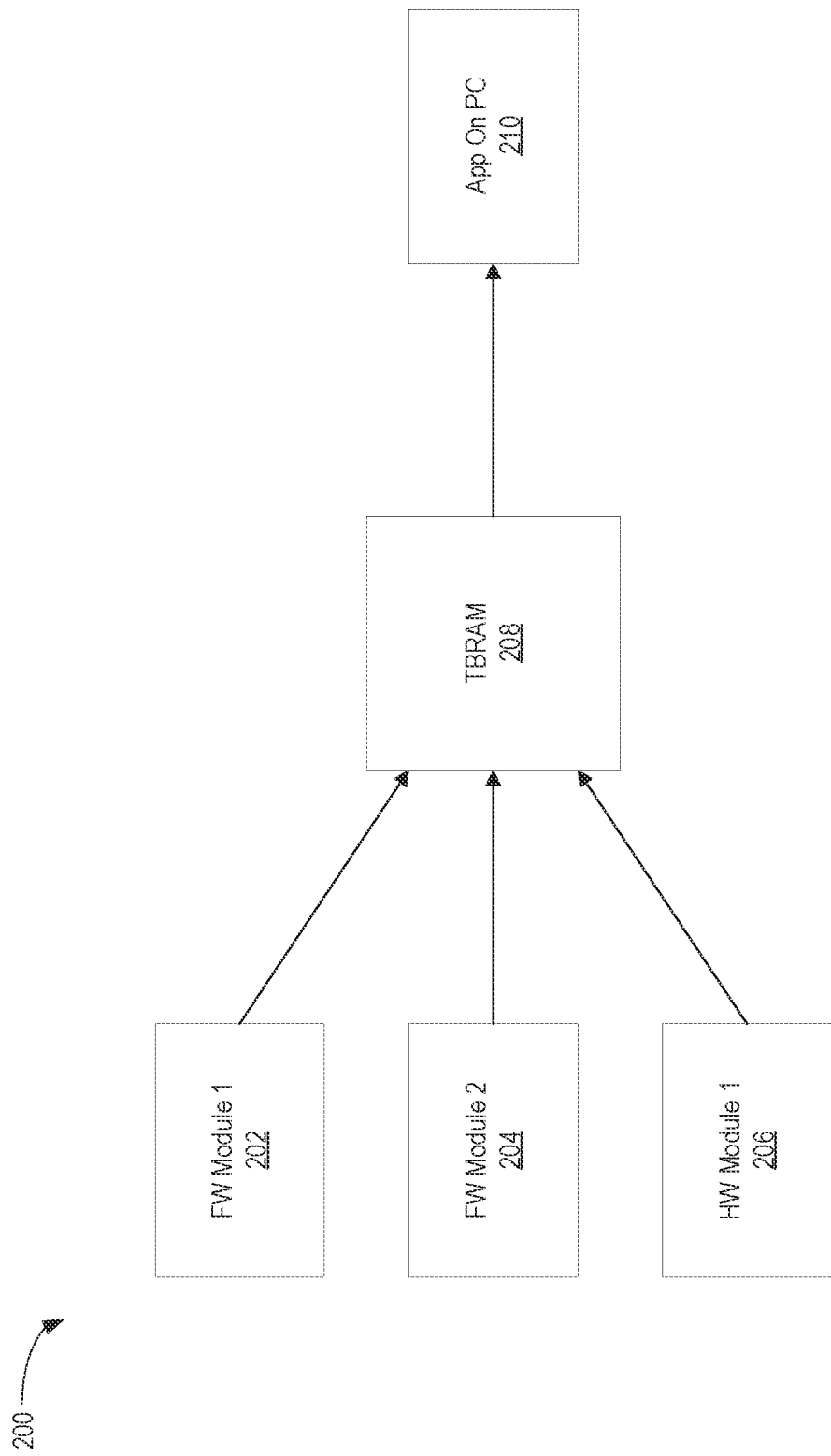
FIG. 2 is schematic block diagram illustrating a method for transferring messages, according to certain embodiments.

FIG. 2 is schematic block diagram illustrating a method 200 for transferring messages, according to certain embodiments. A FW module 1, a FW module 2, a HW module 1 all generate write messages that are sent to the TBRAM or certain types of static RAM's that may exist inside the controller. The TBRAM then sends the messages to the application (i.e., App) on the PC. Each bit from the TBRAM is sent to the App on PC bit by bit. The risk with sending messages to the TBRAM is that information such as serial address information is taken from the TBRAM to be serialized. The amount of messages sent from either the FW module 1, the FW module 2, and/or the HW module 1 to the TBRAM have no way of being identified. All the messages are overlapped with amount of messages sent in a given system.

Figure 3:
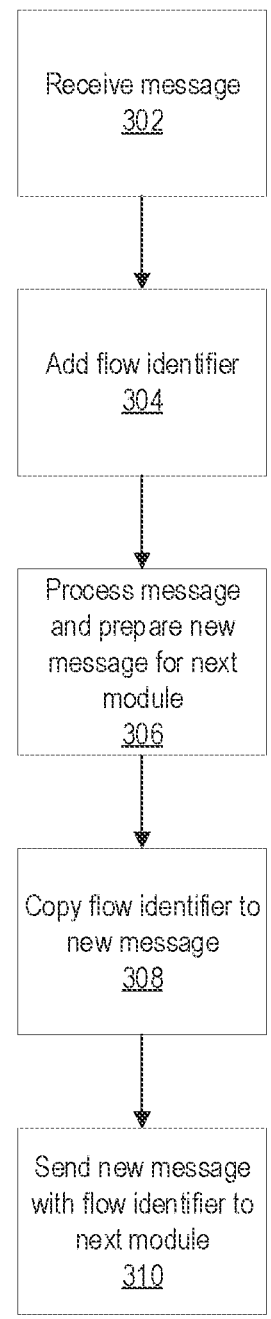
FIG. 3 is a flow chart illustrating a method for transferring messages with a flow identifier, according to certain embodiments.

FIG. 3 is a flow chart illustrating a method 300 for transferring messages with a flow identifier, according to certain embodiments. The flow identifier adds a bit to the messages that can be recognized for identification when needed by the system. When one module activates another module, the flow identifier will be copied from the incoming message to the outgoing message (for HW modules and for FW modules).

Method 300 begins at block 302. At block 302 a module receives a message, which may be from the host device or another module. At block 304, a flow identifier is added to the message that was received by the module. At block 306, the message is processed and a new message is prepared for the next module. At block 308, the flow identifier is copied from the message that was sent from the host or another module and is added to the new message to be sent to a next module. The module that receives the new message is different from the module that the host (or another module) originally sent the original message to. At block 310, the new message with the copied flow identifier is sent to the next module.

For each flow identifier 16 bits (2 bytes) are allocated. The added 16 bits increases the amount of data to write to the TBRAM. All messages that are received at the TBRAM are sent to the PC. The PC receives all the message that are sent to the TBRAM, unless a filter is put on the TBRAM. In previous approaches there are only filters for HW modules and FW modules. Sending all messages sent from the modules forces the system to read all event logs. Reading all event logs will lead to performance degradation.

When logging events out, the flow identifier should be sent out with each message. If 16 bits (i.e., 2 Bytes) are allocated for the flow identifier, in each message, the amount of data that is written to TBRAM is increased, which is not ideal and there is no desire to lose events because of low capacity of TBRAM or of the serial channel. A possible solution to that problem is to not write the flow identifier itself. Rather, an event with flow identifier 0 will be written to the TBRAM that is dedicated to flow identifier 0. Likewise, an event with flow identifier 1 will be written to the TBRAM that is dedicated to flow identifier 1, and so on. In such a manner, the flow identifier is not written out and serial channel capacity is not wasted.

Figure 4:
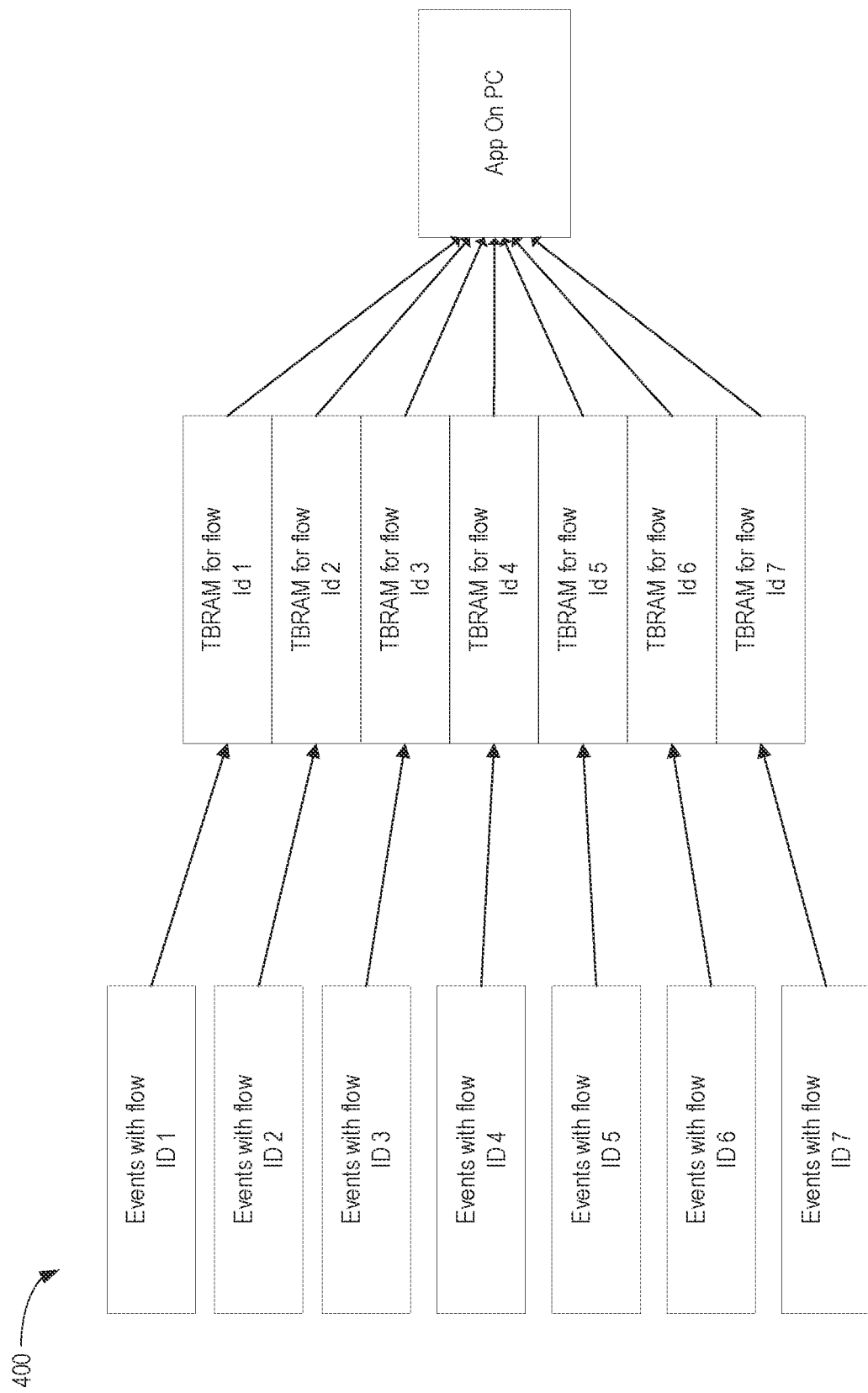
FIG. 4 is schematic block diagram illustrating a method for transferring events with a flow identifier, according to certain embodiments.

FIG. 4 is schematic block diagram illustrating a method 400 for transferring events with a flow identifier, according to certain embodiments. It is to be understood that though method 400 shows only seven events with flow ID' and only seven TBRAM for flow ID', there can be more or less events with flow ID' and TBRAM for flow ID'. For example all events that pertain to the event with flow ID 1 will be sent to a specific address of the TBRAM for flow ID 1. This approach allows for organization when events are sent between modules. Once the event is in the specific address of the TBRAM for flow ID 1, the ID from events flow ID 1 will be copied. The copied ID will then be added to the TBRAM for flow ID 1 to be sent to the App on the PC. Adding the flow identifier to a specific TBRAM to be sent to the PC avoids using extra bit space in other TBRAM's. Saving the 16 bits of room that is allotted for each flow identifier allows more events to be sent.

The flow identifier will be used as the basis for filtering (e.g., by Excel) of data that belongs to a specific flow out of 64 flows. Using the flow identifier along with multiple TBRAM's allows the user to analyze specific flows rather than all the logged data in a single TBRAM as done in previous approaches. The use of multiple TBRAM's allows the system to filter what events are sent to the PC. When there is a reproducible issue in one of the flows or channels, the flows can be filtered. The flow with the issue can be made inactive, while proper work flows can remain active. This allows the system to focus on only data that is needed, which will saved times in debugging and parsing event logs.

In FW there are issues with determining event types and identifying sub-types for events. Determining event types is avoided in the current approach. The flow identifier allows the system to learn more about the types of events that are being sent to avoid the use of queues. Since the flow identifier is sent with each event to different modules, the system has time to learn the events. The system now only has to check the flow identifier for each event to gain further understanding of that event. Flow identifiers increase the efficiency of the system through less code usage.

Figure 5:
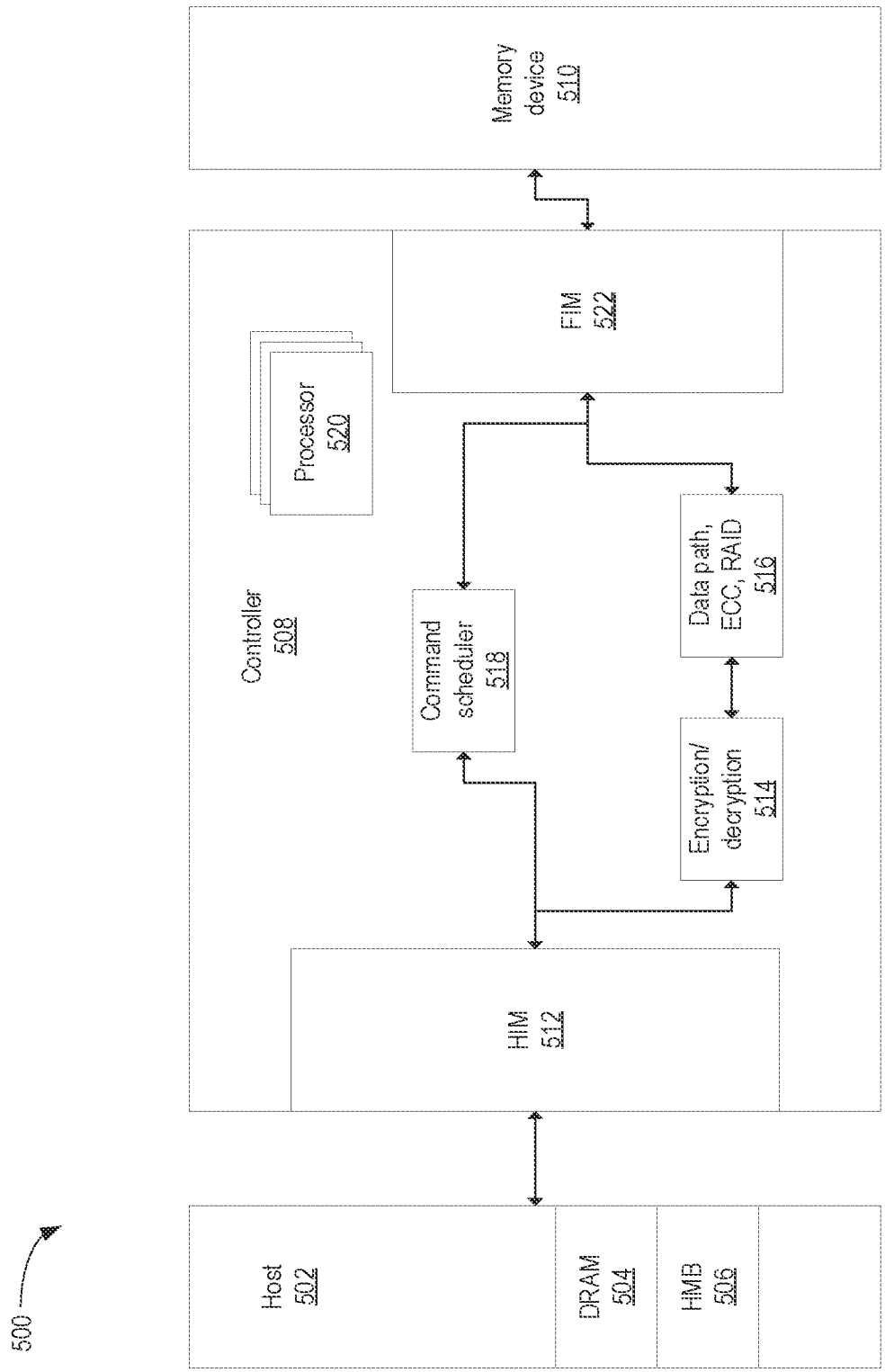
FIG. 5 is a schematic illustration of a system incorporating write command coalescing according to one embodiment and depicts the high-level block diagram of the system for write command coalescing.

FIG. 5 is a schematic illustration of a system 500 incorporating write command coalescing according to one embodiment and depicts the high-level block diagram of the system for write command coalescing. The system 500 includes a host device 502 having DRAM 504 and HMB 506. The system 500 also includes a memory device 510 and a data storage device controller 508.

The controller 508 includes one or more processors 520, a flash interface module FIM 522 for interfacing with the memory device 510, a host interface module (HIM) 512 for interfacing with the host device 502, a command scheduler 518 coupled between the FIM 522 and HIM 512, an encryption/decryption modules 514 disposed between the FIM 522 and HIM 512, and a data path and ECC and RAID 516 disposed between the encryption/decryption module 514 and FIM 522. The HIM 512 decides when to execute the write command.

When an engineer has an issue that is reproducible, and the engineer knows on which track or channel or flow the issue can be reproduced, the flows can be filtered so that only the flow that contains the existing failure will be active with all other flows inactive. Such debugging/parsing is another way to focus only on the data that needs to be reviewed and saves hours or even days of debugging/parsing event logs.

In FW, there can be many cases where an inquiry is made regarding message types, message sub-types, and queue types in order to know how to handle the incoming message. With the flow identifier, the inquiries can be removed because only the flow identifier is needed for an inquiry which will make the FW more efficient and consumes less code.

By using flow identifiers or specific flow paths, debugging time is decreased by decreasing filtering and parsing time for engineers in RMA stages and in the developmental stages. When the system does begin to debug the process is clear and focused. Less events are missed and the amount of lost events are decreased. The FW (after removing inefficient conditions related to flow) can be more efficient by using the flow identifier.

In one embodiment, a data storage device comprises: a memory device; and a controller coupled to the memory device, wherein the controller includes one or more hardware (HW) and/or firmware (FW) modules communicatively couple together, wherein the controller is configured to: receive a first message at a first module; add a flow-identifier to the first message at the first module; process the first message at the first module to create a second message; and send the second message together with the flow-identifier to a third module. The flow identifier comprises eight to sixteen bits. The first message is received from a host device. The first message is received from a third module. The third module creates the first message. The third module is a flash translation layer (FTL). The third module is disposed in the controller. The first module is a host interface module (HIM). The second module is RAM. The RAM is divided into a plurality of subsections and wherein each subsection corresponds to a different flow identifier.

In another embodiment, a data storage device comprising: a memory device; and a controller coupled to the memory device, wherein the controller comprises random access memory (RAM) divided into a plurality of sections, wherein the controller is configured to: direct specific messages originated from either a host device or a module internal to the controller to the RAM, wherein the specific messages correspond to specific events, and wherein the specific events correspond to a specific section of the plurality of sections of the RAM; detect a failure in the data storage device corresponding to a flow for a first specific message of the specific messages; and filter out remaining messages of the specific messages to reveal the flow for the failure. The controller is configured to direct the specific messages from the RAM to one or more processors. The specific messages originate from one or more hardware (HW) modules within the controller. The specific messages originate from one or more firmware (FW) modules within the controller. The specific messages originate from one or more hardware (HW) modules and one or more firmware (FW) modules within the controller. The specific messages originate from a host device and are received by the controller. The controller is further configured to perform a debug operation and wherein the debug operation includes the filtering.

In another embodiment, a data storage device comprise: memory means; and a controller coupled to the memory means, wherein the controller is configured to: attach a first flow identifier to a first message sent between a first module and a second module within the controller; send a second message between the second module and a third module; and attach the first flow identifier to the second message. The controller is further configured to: attach a second flow identifier to a third message sent between the first module and the second module; send a fourth message between the second module and the third module; and attach the second flow identified to the fourth message. At least one of the first module, the second module, and the third module is hardware (HW) and at least one other of the first module, the second module, and the third module is firmware (FW).

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller includes one or more hardware (HW) and/or firmware (FW) modules communicatively couple together, wherein the controller is configured to:
receive a first message at a first module;
add a flow-identifier to the first message at the first module;
process the first message at the first module to create a second message;
send the second message together with the flow-identifier to a second module; and
send the flow-identifier to a third module, wherein the first module, the second module, and the third module are distinct.

2. The data storage device of claim 1, wherein the flow identifier comprises eight to sixteen bits.

3. The data storage device of claim 1, wherein the first message is received from a host device.

4. The data storage device of claim 1, wherein the first message is received from the third module.

5. The data storage device of claim 4, wherein the third module creates the first message.

6. The data storage device of claim 5, wherein the third module is a flash translation layer (FTL).

7. The data storage device of claim 4, wherein the third module is disposed in the controller.

8. The data storage device of claim 1, wherein the first module is a host interface module (HIM).

9. The data storage device of claim 1, wherein the second module is RAM.

10. The data storage device of claim 9, wherein the RAM is divided into a plurality of subsections and wherein each subsection corresponds to a different flow identifier.

11. A data storage device, comprising:
a memory device; and
a controller coupled to the memory device, wherein the controller comprises random access memory (RAM) divided into a plurality of sections, wherein the controller is configured to:
direct specific messages originated from either a host device or a module internal to the controller to the RAM, wherein the specific messages correspond to specific events, and wherein the specific events correspond to a specific section of the plurality of sections of the RAM, wherein the directing comprises attaching a flow-identifier to the specific messages to direct the specific messages to corresponding specific sections of the plurality of sections of the RAM;
detect a failure in the data storage device corresponding to a flow for a first specific message of the specific messages; and
filter out remaining messages of the specific messages to reveal the flow for the failure.

12. The data storage device of claim 11, wherein the controller is configured to direct the specific messages from the RAM to one or more processors.

13. The data storage device of claim 11, wherein the specific messages originate from one or more hardware (HW) modules within the controller.

14. The data storage device of claim 11, wherein the specific messages originate from one or more firmware (FW) modules within the controller.

15. The data storage device of claim 11, wherein the specific messages originate from one or more hardware (HW) modules and one or more firmware (FW) modules within the controller.

16. The data storage device of claim 11, wherein the specific messages originate from a host device and are received by the controller.

17. The data storage device of claim 11, wherein the controller is further configured to perform a debug operation and wherein the debug operation includes the filtering.

18. A data storage device, comprising:
memory means; and
a controller coupled to the memory means, wherein the controller is configured to:
attach a first flow identifier to a first message sent between a first module and a second module within the controller;
send a second message between the second module and a third module;
attach the first flow identifier to the second message;
attach a second flow identifier to a third message sent between the first module and the second module;
send a fourth message between the second module and the third module; and
attach the second flow identified to the fourth message.

19. The data storage device of claim 18, wherein at least one of the first module, the second module, and the third module is hardware (HW) and at least one other of the first module, the second module, and the third module is firmware (FW).

* * * * *